US010491758B2

United States Patent
Nagabushanam (10) Patent No.: US 10,491,758 B2
(45) Date of Patent: Nov. 26, 2019

(54) METHOD AND SYSTEM FOR OPTIMIZING IMAGE DATA FOR DATA TRANSMISSION

(71) Applicant: Wipro Limited, Bangalore (IN)

(72) Inventor: Sudhakar Getamaneni Nagabushanam, Bengaluru (IN)

(73) Assignee: Wipro Limited, Bangalore (IN)

( * ) Notice: Subject to any disclaimer, the term of this patent is extended or adjusted under 35 U.S.C. 154(b) by 121 days.

(21) Appl. No.: 15/719,173

(22) Filed: Sep. 28, 2017

(65) Prior Publication Data

US 2019/0058799 A1    Feb. 21, 2019

(30) Foreign Application Priority Data

Aug. 16, 2017  (IN) .............................. 201741028953

(51) Int. Cl.
*H04N 1/00* (2006.01)
*H04N 1/32* (2006.01)

(52) U.S. Cl.
CPC ..... *H04N 1/00095* (2013.01); *H04N 1/00244* (2013.01); *H04N 1/00912* (2013.01);
(Continued)

(58) Field of Classification Search
CPC ........... H04N 1/00095; H04N 1/32128; H04N 1/00912; H04N 1/00244;
(Continued)

(56) References Cited

U.S. PATENT DOCUMENTS

2013/0156095 A1*  6/2013  Li ........................ H04N 21/233
                                                 375/240.02
2013/0198829 A1*  8/2013  Bund .................... H04L 63/029
                                                 726/11
(Continued)

FOREIGN PATENT DOCUMENTS

CN          101873224 A      10/2010
CN          103281526 A       9/2013

OTHER PUBLICATIONS

Lu, "Cognitive Network Based Adaptive Load Balancing Algorithm for Emerging Technology Applications", International Journal of Computer Science and Applications, 2016, pp. 31-41,vol. 13, No. 1, Retrieved from the Internet:<http://www.tmrfindia.org/ijcsa/v13i13.pdf>.

(Continued)

*Primary Examiner* — Nhan T Tran
(74) *Attorney, Agent, or Firm* — Pepper Hamilton LLP (57) ABSTRACT

This disclosure relates generally to edge computing, and more particularly to method and system for optimizing image data for data transmission. In one embodiment, a method is provided for optimizing image data for transmission to a server. The method may include receiving a plurality of server rules from the server with respect to an optimization and a transmission of the image data, generating a plurality of local decision making rules based on the plurality of server rules and one or more local events, analyzing at least a first portion of the image data based on the plurality of local decision making rules to generate image analytics data, and generating optimized image data for transmission to the server. The optimized image data comprises at least a second portion of the image data and the image analytics data.

20 Claims, 7 Drawing Sheets

(52) U.S. Cl.
CPC . *H04N 1/32128* (2013.01); *H04N 2201/0031* (2013.01); *H04N 2201/0039* (2013.01); *H04N 2201/0084* (2013.01); *H04N 2201/3215* (2013.01); *H04N 2201/3222* (2013.01); *H04N 2201/3278* (2013.01)

(58) Field of Classification Search
CPC ... H04N 2201/0039; H04N 2201/3278; H04N 2201/0031; H04N 2201/3222; H04N 2201/0084; H04N 2201/3215
See application file for complete search history.

(56) References Cited

U.S. PATENT DOCUMENTS

| | | | | |
|---|---|---|---|---|
| 2015/0229826 | A1* | 8/2015 | Ikeda | G03B 7/00 |
| | | | | 348/211.3 |
| 2017/0278368 | A1* | 9/2017 | Burke | G08B 13/19656 |
| 2017/0300758 | A1* | 10/2017 | Renkis | H04N 7/181 |
| 2018/0278543 | A1* | 9/2018 | Gopalan | H04L 47/823 |
| 2018/0279248 | A1* | 9/2018 | Nishiguchi | H04W 4/80 |
| 2018/0285772 | A1* | 10/2018 | Gopalan | G06N 7/005 |

OTHER PUBLICATIONS

Deng et al., "A Load Balancing Strategy with Bandwidth Constraint in Cloud Computing", The Open Cybernetics & Systemics Journal, 2014, pp. 115-121,vol. 8, Retrieved from the Internet:<https://benthamopen.com/contents/pdf/TOCSJ/TOCSJ-8-115.pdf>.

* cited by examiner

METHOD AND SYSTEM FOR OPTIMIZING IMAGE DATA FOR DATA TRANSMISSION

This application claims the benefit of Indian Patent Application Serial No. 201741028953, filed Aug. 16, 2017 which is hereby incorporated by reference in its entirety.

FIELD

This disclosure relates generally to edge computing, and more particularly to method and system for optimizing image data for data transmission.

BACKGROUND

A wide variety of applications may require capturing, processing, and analysis of images. Many applications (e.g., internet of things (TOT) applications, telemetry applications, surveillance applications, etc.), may require the images to be captured at one location and to be processed at another location. Thus, the images may be captured at certain location, uploaded, and sent to a remote server over cloud for further analysis and storage. However, such applications may present challenges due to limitations in processing power, and network bandwidth between server and edge nodes. For example, many devices may have an always-on connection but the connection speed may be limited. Further, many a times the devices may have good connection speed but the server may have limited processing power. Hence, it may be challenging to store and analyze all the images that are captured by the application.

Existing techniques tries to overcome above challenges by employing traffic prediction model, least load scheduling in real-time, relative load balancing scheduling, and so forth. However, existing techniques fail to balance between connection speed and bandwidth, processing power, load on available resources, and so forth. In other words, existing techniques fail to optimize captured image data for transmission and remote processing.

SUMMARY

In one embodiment, a method for optimizing image data for transmission to a server is disclosed. In one example, the method may include receiving a plurality of server rules from the server with respect to an optimization and a transmission of the image data. The method may further include generating a plurality of local decision making rules based on the plurality of server rules and one or more local events. The method may further include analyzing at least a first portion of the image data based on the plurality of local decision making rules to generate image analytics data. The method may further include generating optimized image data for transmission to the server. The optimized image data may include at least a second portion of the image data and the image analytics data.

In one embodiment, a system for optimizing image data for transmission to a server is disclosed. In one example, the system may include at least one processor and a memory communicatively coupled to the at least one processor. The memory may store processor-executable instructions, which, on execution, may cause the processor to receive a plurality of server rules from the server with respect to an optimization and a transmission of the image data. The processor-executable instructions, on execution, may further cause the processor to generate a plurality of local decision making rules based on the plurality of server rules and one or more local events. The processor-executable instructions, on execution, may further cause the processor to analyze at least a first portion of the image data based on the plurality of local decision making rules to generate image analytics data. The processor-executable instructions, on execution, may further cause the processor to generate optimized image data for transmission to the server. The optimized image data may include at least a second portion of the image data and the image analytics data.

In one embodiment, a non-transitory computer-readable medium storing computer-executable instructions for optimizing image data for transmission to a server is disclosed. In one example, the stored instructions, when executed by a processor, may cause the processor to perform operations including receiving a plurality of server rules from the server with respect to an optimization and a transmission of the image data. The operations may further include generating a plurality of local decision making rules based on the plurality of server rules and one or more local events. The operations may further include analyzing at least a first portion of the image data based on the plurality of local decision making rules to generate image analytics data. The operations may further include generating optimized image data for transmission to the server. The optimized image data may include at least a second portion of the image data and the image analytics data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
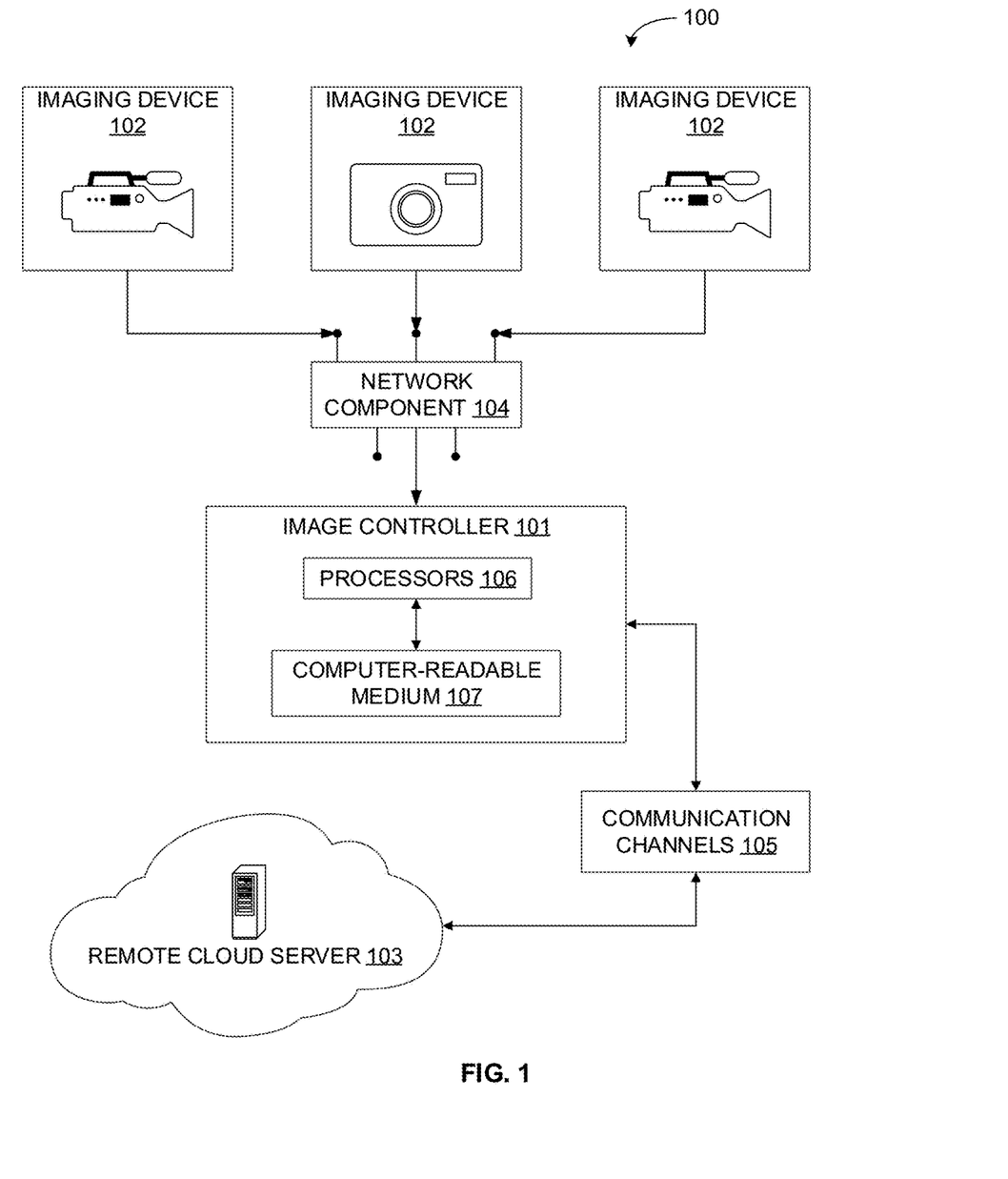
FIG. 1 is a block diagram of an exemplary system for optimizing image data for transmission to a server in accordance with some embodiments of the present disclosure.

Referring now to FIG. 1, an exemplary system 100 for optimizing image data for transmission to a server is illustrated in accordance with some embodiments of the present disclosure. In particular, the system 100 may include an image controller 101, one or more imaging devices 102, and a remote cloud server 103. The image controller 101 may receive image data (e.g., video or images) from the imaging devices 102, and may optimize the image data for subsequent transmission to the remote cloud sever 103. As will be appreciated by those skilled in the art, the imaging device 102 may be any device capable of acquiring image data such as video camera, digital camera, surveillance camera, computers, laptops, personal computing devices (e.g., tablet computers, smartphones, etc.), and so forth. Thus, the imaging device 102 may include at least lens, imager (i.e., image sensors), and a recorder (e.g., memory) among other components. Additionally, as will be appreciated, the imaging device 102 may be located locally or remotely with respect to the image controller 101. For example, in some embodiments, some of the imaging devices 102 may be located locally with respect to the image controller 101 while some of the imaging devices 102 may be located remotely with respect to the image controller 101. Further, the imaging devices 102 may be directly coupled to the image controller 101 or may be coupled to the image controller 101 through a network component 104 (e.g., router, bridge, switch, hub, gateway, wireless access point, etc.) or through an intermediary device (e.g., digital video recorder, storage device, etc.).

As will be appreciated by those skilled in the art, the remote cloud server 103 may be any processor-based device capable of storing and processing image data and other information received from the image controller. Thus, the remote cloud server 103 may include at least a processor and a storage device among other components. The image controller 101 and the remote cloud server 103 may interact with each other over a communication channel 105. Thus, in some embodiments, the image controller 101 may receive server rules from the remote cloud server 103 over the communication channel 105, while the remote cloud server 103 may receive raw image data, optimized image data, image analytics, and any other information as deemed necessary from the image controller 101 over the communication channel 105. The communication channel 108 may be any wired or wireless communication channel (e.g., Internet) based on different communication technologies.

The image controller 101 may implement an image controller engine for receiving the image data from the imaging devices 101, and for optimizing the received image data for transmission to the remote cloud server 103. As will be described in greater detail in conjunction with FIG. 2, the image controller engine may receive a plurality of server rules from the remote cloud server 103 with respect to an optimization and a transmission of the image data, may generate a plurality of local decision making rules based on the plurality of server rules and one or more local events, may analyze at least a first portion of the image data based on the plurality of local decision making rules to generate image analytics data, and may generate optimized image data for transmission to the remote cloud server 103. The optimized image data includes at least a second portion of the image data and the image analytics data.

The image controller 101 may include one or more processors 106 and a computer-readable medium (e.g., a memory) 107. The computer-readable medium 107 may store instructions that, when executed by the one or more processors 106, may cause the one or more processors 106 to receive and optimize the image data, and to transmit the optimized image data in accordance with aspects of the present disclosure. The computer-readable storage medium 107 may also store multiple system and network parameters captured by the image controller 101 and other data as required or as processed by the image controller 101 or the system 100. The one or more processors 106 may perform data processing functions so as to receive the image data, tag the image data, receive the server rules, generate local decision making rules, analyze the image data, generate the optimized image data, monitor local events, initiate machine learning process, update the server rules, and transmit the optimized image data.

As stated above, in some embodiments, the image controller 101 may be located locally with respect to the imaging devices 102. For example, in some embodiments, the image controller 101 may be a separate device in communication with the imaging devices 102. Alternatively, in some embodiments, the image controller 101 may be embedded within each or one of the imaging devices 102. Further, as stated above, in some embodiments, the image controller 101 may be located remotely with respect to the imaging devices 102. For example, in some embodiments, the image controller 101 may be located in a remote server of an image optimization service provider. Alternatively, in some embodiments, the image controller 101 may be embedded within the remote cloud server 103.

Further, as will be appreciated, in some embodiments, various components of the image controller 101 may be physically located together in one device. Alternatively, in some embodiments, the components of the image controller 101 may be physically distributed across various devices. For example, the processors 106 and the computer readable medium 107 of the image controller 101 may be physically located together in one device (e.g., the image controller 101) or may be physically distributed across various devices (e.g., the image controller 101, the imaging device 102, and/or the remote cloud server 103).

Figure 2:
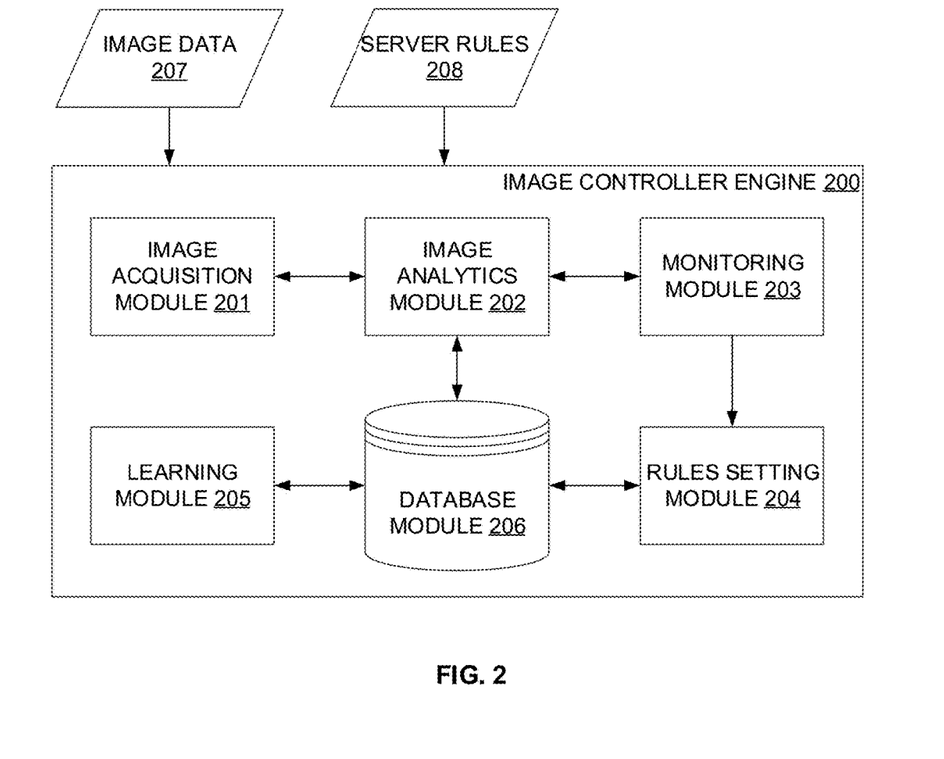
FIG. 2 is a functional block diagram of an image controller engine in accordance with some embodiments of the present disclosure.

Referring now to FIG. 2, a functional block diagram of the image controller engine 200, implemented by the image controller 101 of the system 100 of FIG. 1, is illustrated in accordance with some embodiments of the present disclosure. In some embodiments, the image controller engine 200 may include an image acquisition module 201, an image analytics module 202, a monitoring module 203, a rules setting module 204, a learning module 205, and a database 206. As will be appreciated by those skilled in the art, each of the modules 201-205 and the database 206 may reside, in whole or in parts, on any of the image controller 101, the imaging device 102, and/or the remote cloud server 103.

The image acquisition module 201 may acquire the image data 207 including images from the one or more imaging devices. Additionally, the image acquisition module 201 may tag the images with at least one of a timestamp and a processing status. The processing status may include, but is not limited to, captured, analyzed, transmitted, image analytics data or metadata transmitted, and so forth. Further, in some embodiments, the image acquisition module 201 may store the image data 207 and the tagged image data in the database 206.

The image analytics module 202 may receive the acquired image data 207 from the image acquisition module 201 or from the database 206. The image analytics module 202 may further receive various rules and associated parameters (e.g., server rules 208, local decision making rules, etc.) for performing analysis from the database 206. The image analytics module 202 may then analyze at least a portion of the image data 207 based on the received rules to generate image analytics data. For example, in some embodiments, the image analytics module 202 may perform the image analytics functions, and may compute the analysis vectors based on various image attributes, as requested by the remote cloud server (e.g., based on the server rules 208) and as required by the image controller (e.g., based on the local decision making rules). Additionally, the image analytics module 202 may generate optimized image data for transmission to the remote cloud server based at least on the image analytics data using the received rules. In some embodiments, the optimized image data may further include portions of the image data 207 (e.g., raw image feeds without image analytics) or portions of the optimized image data (e.g., optimized image feeds without image analytics). It should be noted that the image analytics module 202 may receive the rules for performing optimization along with the associated parameters from the database 206. Thus, the image analytics module 202 may help in optimizing the image data, which in turn may help in balancing the load of remote cloud server and optimizing bandwidth of the connection link between the image controller and the remote cloud server. In some embodiments, the image analytics module 202 may store the image analytics data and/or the optimized image data in the database 206. Moreover, in some embodiments, the image analytics module 202 may transmit the optimized image data to the remote cloud server based on the received rules.

The monitoring module 203 may be a live agent responsible for monitoring one or more local events. In some embodiments, the local events may include, but are not limited to, system parameters with respect to the image controller, network parameters with respect to a communication channel between the image controller and the server, and so forth. For example, the system parameters may include critical parameters of the image controller such as a processing load of the image controller. Further, the network parameter may include critical parameters with respect to communication link between the image controller and the remote cloud server such as available bandwidth, required bandwidth, idle speed, and so forth. In some embodiments, the local events (i.e., monitored parameters) may be stored in the database 206 for use by other modules. It should be noted that the local events may be employed by the rules setting modules 204 so as to set the rules in various modules or by the learning module 205 so as to generate the local decision making rules.

The rules setting module 204 may be responsible for setting various rules, based on which the other modules may function. In some embodiments, the setting of the rules in various modules may be based on the local events monitored by the monitoring module 203. It should be noted that the rules may be pushed remotely (e.g., by the remote cloud server) or may be generated locally (e.g., by the learning module 205). In some embodiments, the rules setting module 204 may access the server rules 208 and/or the locally generated rules from the database 206, and may configure the received rules in corresponding modules such as image acquisition module 201, image analytics module 202, and so forth.

The learning module 205 may receive the server rules 208 with respect to an optimization and a transmission of the image data 207 from the remote cloud server and may store the received server rules 208 in the database 206. Alternatively, the learning module 205 may receive the server rules 208 from the database 206. In some embodiments, the server rules 208 may include, but are not limited to, image analysis rules, image optimization rules, and data transmission rules. The learning module 205 may further receive local events (i.e., monitored parameters) from the monitoring module 203 or the database 206. The learning module 205 may then generate local decision making rules (i.e., new rules created locally) based on the server rules 208 and the local events. Additionally, in some embodiments, the learning module 205 may receive the image data 207 from the image acquisition module 201 or the database 206, and the image analytics data from the image analytics module 202 or the database 206, and may generate local decision making rules further based on the image data 207 and the image analytics data. In some embodiments, the learning module 205 may initiate a machine learning algorithm so as to generate the local decision making rules. Thus, the learning module 205 may self-learn from the server rules 208 and the local events, and/or from at least one of the image data 207, and the image analytics data. The generated local decision making rules may be stored in the database 206. Additionally, the learning module 205 may transmit the local decision making rules to the remote cloud server, which may then update the server rules 208 based on the local decision making rules. Alternatively, the learning module 205 may update the server rules 208 based on the local decision making rules, and may transmit the updated server rules to the remote cloud server. Such update of the server rules 208 may be performed at a regular interval or after each learning process.

It should be noted that the image controller engine 200 may be implemented in programmable hardware devices such as programmable gate arrays, programmable array logic, programmable logic devices, and so forth. Alternatively, the image controller engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

Figure 3:
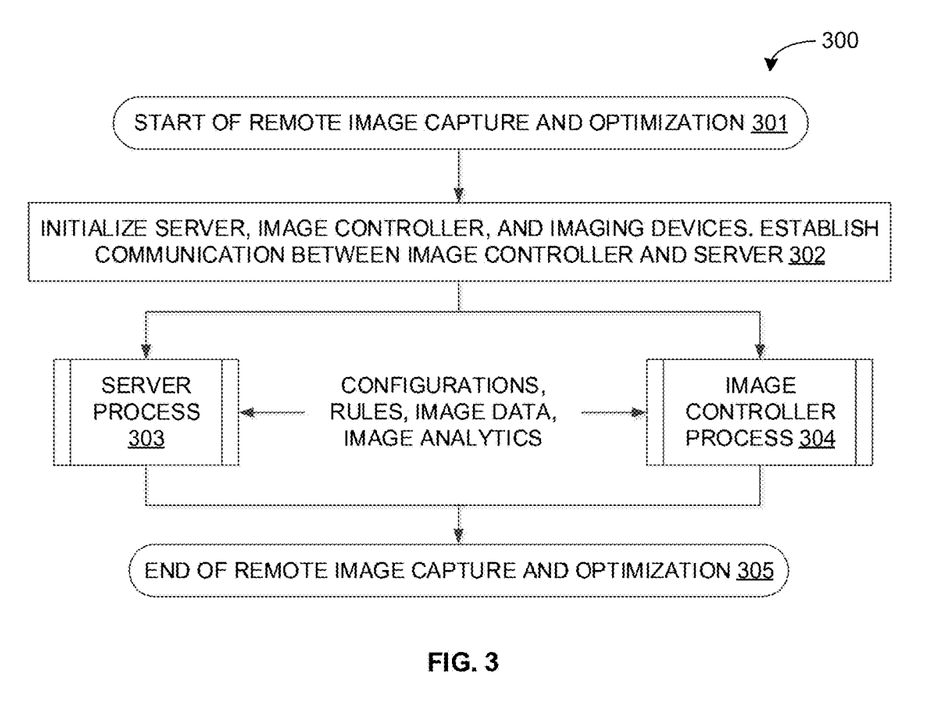
FIG. 3 is a flow diagram of an exemplary process overview for optimizing image data for transmission to a server in accordance with some embodiments of the present disclosure.

Referring now to FIG. 3, an overview of an exemplary process 300 for optimizing image data for transmission is depicted via a flowchart in accordance with some embodiments of the present disclosure. The process 300 may start remote image capture and optimization at step 301. The process 300 may further involve the steps of initializing the system (i.e., imaging devices, image controller, remote cloud server, etc.) and establishing a communication link between image controller and the remote cloud server at step 302, executing a server process at step 303, and executing in parallel an image controller process at step 304. The process 300 may then end remote image capture and optimization by stopping the image controller and other sub systems at step 305. Each of these steps will be described in greater detail herein below.

At step 302, each of the imaging devices deployed in the field for a given application (e.g., internet of things (JOT) application, telemetry application, surveillance application, etc.) may be initialized for capturing the image data (e.g., videos, images, etc.). Additionally, the image controller (e.g., edge image controller deployed at for a set of imaging devices) deployed for the multiple imaging devices may be initialized for optimizing the image data received from the multiple imaging devices and for sending the optimized image data to the remote cloud server. Further, the remote cloud server may be initialized for receiving the optimized image data (e.g., videos, images, etc.) from the multiple imaging devices through the image controller. Moreover, the communication link between image controller and the remote cloud server may be established. In some embodiments, the establishment of communication link may involve authentication of the image controller, and identification of the image controller from among multiple image controllers deployed for one or more applications at one or more geographic locations. It should be noted that, upon initialization, each of the imaging devices may start capturing image data.

At step 303, the remote cloud server may initiate sever process upon initialization. The remote cloud server may send server rules and associated configuration parameters to the image controller. The server rules may define techniques for optimizing the image data and techniques for transmitting the optimized image data. In some embodiments, the server rules may include, but are not limited to, image analysis rules, image optimization rules, and data transmission rules. The image analysis rules may specify a type of image analysis required, a definition of a portion of the image data on which the image analysis may be performed, image analysis configuration parameters, and so forth. Similarly, the image optimization rules may specify a type of image optimization required, a definition of a portion of the image data on which the image optimization may be performed, image optimization configuration parameters, and so forth. Further, the data transmission rules may specify a type of data that is to be transmitted, data transmission configuration parameters, and so forth.

Figure 4:
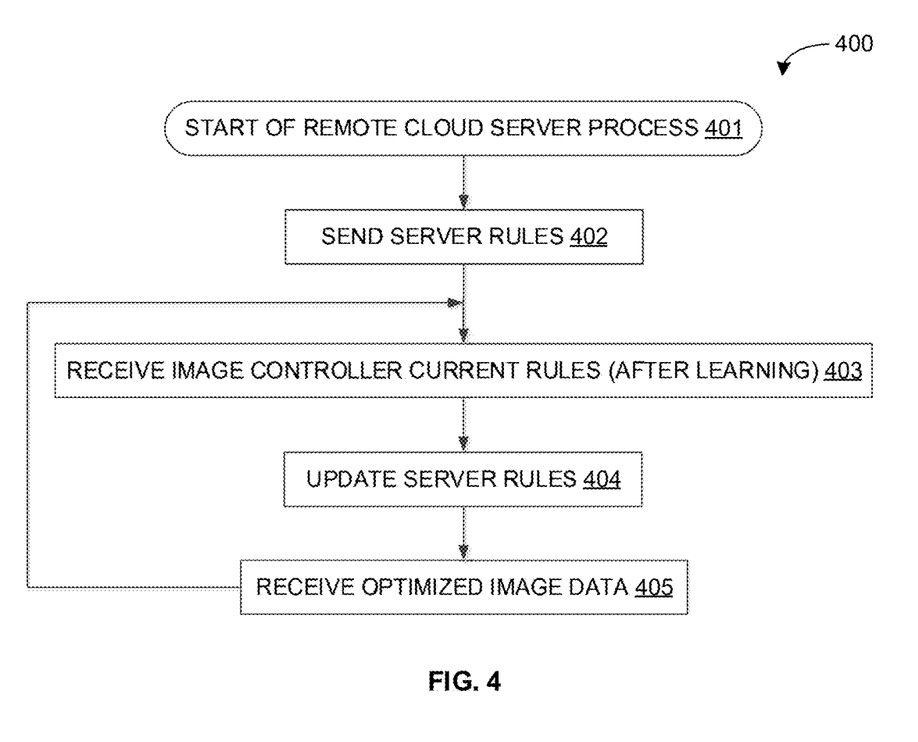
FIG. 4 is a flow diagram of an exemplary server process for optimizing image data for transmission in accordance with some embodiments of the present disclosure.

Referring now to FIG. 4, an exemplary server process 400 for optimizing image data for transmission is depicted via a flowchart in accordance with some embodiments of the present disclosure. At step 401, the remote cloud server process may start upon initialization of the remote cloud server. At step 402, the remote cloud server may send the server rules along with the associated configuration parameters to the image controller. At step 403, the remote cloud server may receive current local rules of the image controller (after learning). At step 404, the remote cloud server may update the server rules based on the current local rules of the image controller. At step 405, the remote cloud server may receive optimized image data from the image controller. As will be appreciated, the steps of receiving current rules 403 and updating of server rules 404 may occur after every learning (i.e., each time after receiving the optimized image data at step 405) or at a regular interval.

Referring back to FIG. 3, at step 304, the image controller may initiate image controller process upon initialization. The image controller may acquire image data from the multiple imaging devices, may perform required optimization based on the local decision making rules (which is generated based on the learning of the rules defined by the remote cloud server and the local events), and may transmit the optimized image data and other relevant data to the remote cloud server. In other words, the image controller process may be based on rules defined by the remote cloud server, decisions of the image controller engine based on local events, and/or learning of the server defined rules and the local events.

As stated above, in some embodiments, the remote cloud server may inform the image controller about its requirement using the server rules. For example, the remote cloud server may inform the image controller whether an image is required or image analytics based on local processing is required. Additionally, if Image analytics is required, the type of image analytics required from among many types of statistical analysis (e.g., boundary detection, pattern matching, motion detection, motion vector, etc.) may be specified. Additionally, the remote cloud server may specify the configuration parameters for statistical parameters for image analytics along with the rules. Further, in some embodiments, the remote cloud server may also specify portion of the image data (e.g., only from a particular imaging device, only for first 5 minutes of image data, etc.) on which the image analytics is to be performed. In some embodiments, the remote cloud server may also specify if any other optimization needs to be performed on other portion of the image data that has not been subjected to the image analytics. Moreover, in some embodiments, the remote cloud server may specify conditions for transmission of the image data and/or optimized image data (e.g., raw feeds, image analytics data, optimized data, parameters, etc.).

The image controller may typically configure the rules as defined by the remote cloud server. However, the image controller may monitor local events or local conditions at the image controller such as system parameters (e.g., available processing power of the image controller), network parameters (e.g., link bandwidth available for transmission, bandwidth required for transmission, etc.), and so forth. The image controller may then modify the server rules based on machine learning of the server rules and the monitored local events. For example, based on the estimates of processing power and bandwidth available and the machine learning, the image controller may modify the server rules. In such scenarios, the image controller may configure the modified rules (i.e., local decision making rules). The image controller may then optimize the image data and send the optimized image data to the remote cloud server based on the configured rules. Further, the image controller may also modify or adapt configuration parameters such as resolution for captured image or video, statistical parameters for image analytics, etc. so as to reduce the complexity of local processing for optimizing the image data and/or to reduce the bandwidth requirement for transmitting the optimized image data.

Figure 5:
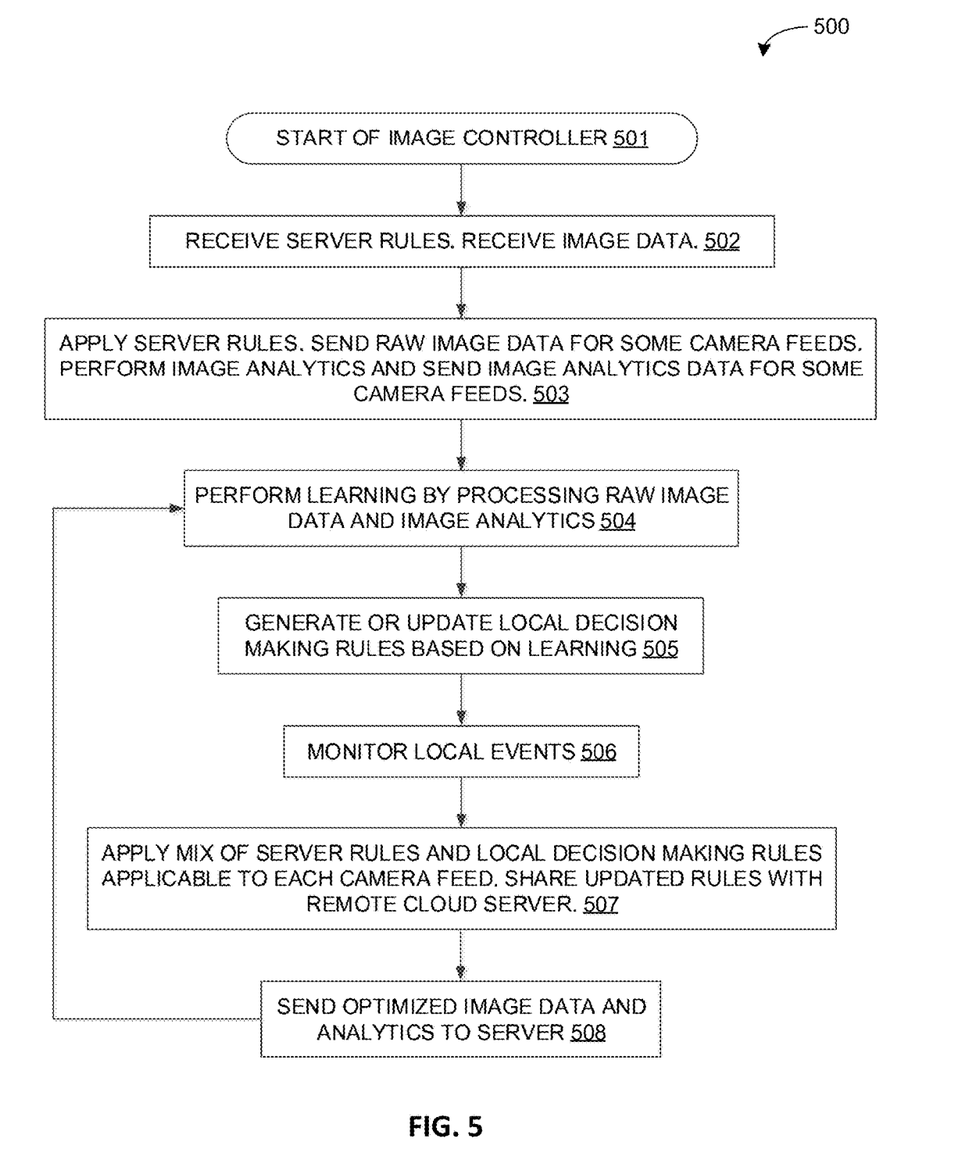
FIG. 5 is a flow diagram of an exemplary image controller process for optimizing image data for transmission in accordance with some embodiments of the present disclosure.

Referring now to FIG. 5, an exemplary image controller process 500 for optimizing image data for transmission is depicted via a flowchart in accordance with some embodiments of the present disclosure. At step 501, the image controller process may start upon initialization of the image controller. At step 502, the image controller may receive the server rules from the remote cloud server and may receive the image data from the multiple imaging devices. At step 503, the image controller may apply the server rules for optimization of the image data. For example, in some embodiments, the image controller may send some of the image data as is (i.e., send raw image data for some camera feeds) to the remote cloud server. Further, in some embodiments, the image controller may optimize some of the image data based on image optimization rules provided by the server rules, and may send optimized image data to the remote cloud server. Further, in some embodiments, the image controller may perform image analytics on some of the image data based on image analysis rules provided by the server rules, and may send the image analytics data to the remote cloud server. The raw image data, the optimized image data, or the image analytics data (commonly referred to as optimize image data) may itself be transmitted based on data transmission rules provided by the server rules.

At step 504, the image controller may perform machine learning by processing raw image data and image analytics data. At step 505, the image controller may further generate or update local decision making rules based on the machine learning. At step 506, the image controller may monitor local events (i.e., system parameters, network parameters, etc.). At step 507, the image controller may apply a mix of server rules and local decision making rules (i.e., self-learning rules) application to respective portions of the image data (e.g., each of the camera feeds) to perform optimization of the image data. The image controller may further share the updated rules with the remote cloud server, which may then update the server rules accordingly. At step 508, the image controller may send optimized image data (including image analytics data) to the remote cloud server in accordance with the updated rules for data transmission.

As will be appreciated by one skilled in the art, a variety of processes may be employed for optimizing image data for transmission to a server. For example, the exemplary system 100 may optimize image data and transmit the optimized image data by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 6:
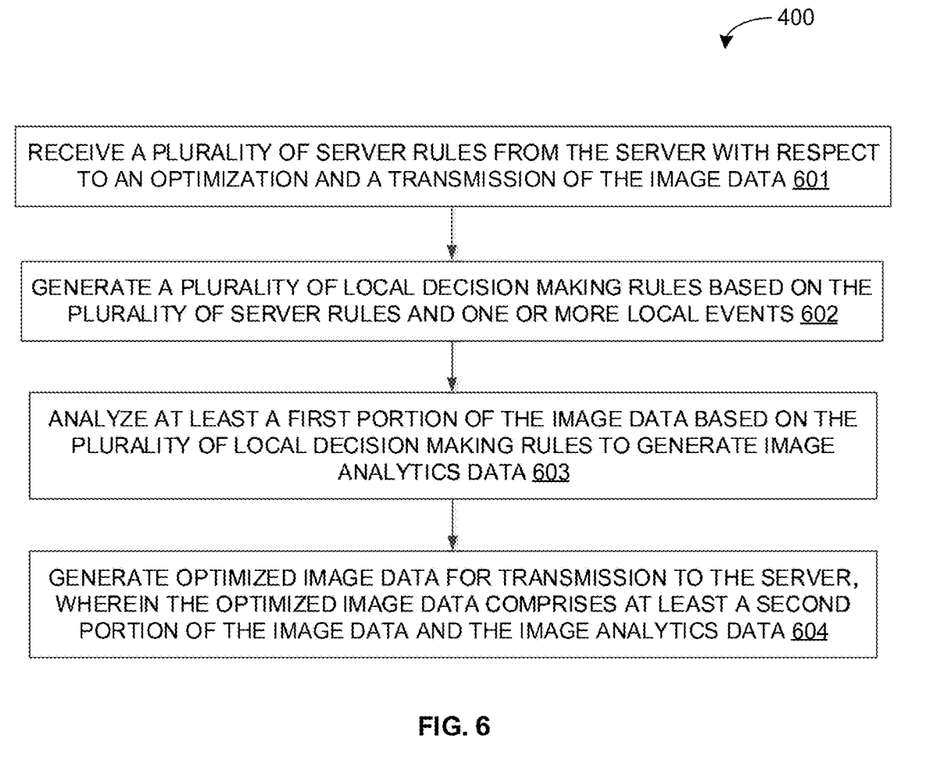
FIG. 6 is a flow diagram of an exemplary process for optimizing image data for transmission to a server in accordance with some embodiments of the present disclosure.

For example, referring now to FIG. 6, exemplary control logic 600 for optimizing image data for transmission to a server via a system, such as system 100, is depicted via a flowchart in accordance with some embodiments of the present disclosure. As illustrated in the flowchart, the control logic 600 may include the steps of receiving a plurality of server rules from the server with respect to an optimization and a transmission of the image data at step 601, generating a plurality of local decision making rules based on the plurality of server rules and one or more local events at step 602, analyzing at least a first portion of the image data based on the plurality of local decision making rules to generate image analytics data at step 603, and generating optimized image data for transmission to the server at step 604. The optimized image data may include at least a second portion of the image data and the image analytics data.

In some embodiments, the control logic 600 may further include the steps of receiving the image data from one or more imaging devices, and tagging the image data with at least one of a timestamp and a processing status. Additionally, in some embodiments, the control logic 600 may further include the step of transmitting the optimized image data based on the plurality of local decision making rules. Moreover, in some embodiments, the control logic 600 may further include the steps of transmitting the plurality of local decision making rules to the server, and updating the plurality of server rules based on the plurality of local decision making rules. Furthermore, in some embodiments, the control logic 600 may include the step of monitoring the one or more local events. In some embodiments, the one or more local events may include at least one of a system parameter with respect to the image controller, and a network parameter with respect to a communication channel between the image controller and the server. Additionally, in some embodiments, the system parameter may include a processing load. Further, in some embodiments, the network parameter may include at least one of an available bandwidth, and a required bandwidth.

In some embodiments, the plurality of server rules may include at least one of a set of image analysis rules, a set of image optimization rules, and a set of data transmission rules. Additionally, in some embodiments, the set of image analysis rules may specify at least one of a type of image analysis required, a definition of at least the first portion of the image data, and a plurality of image analysis configuration parameters. Further, in some embodiments, the set of image optimization rules may specify at least one of a type of image optimization required, a definition of at least the second portion of the image data, and a plurality of image optimization configuration parameters. Moreover, in some embodiments, the set of data transmission rules may specify at least one of a type of data that is to be transmitted, and a plurality of data transmission configuration parameters.

In some embodiments, generating the plurality of local decision making rules at step 602 may include initiating a machine learning process based on the plurality of server rules and the one or more local events. Additionally, in some embodiments, the machine learning process may be further based on the image data and the image analytics data. Further, in some embodiments, the one or more local events may include at least one of a system parameter, and a network parameter. Moreover, in some embodiments, generating the optimized image data at step 604 may further include optimizing at least the second portion of the image data based on the plurality of local decision making rules.

As will be also appreciated, the above described techniques may take the form of computer or controller implemented processes and apparatuses for practicing those processes. The disclosure may also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

Figure 7:
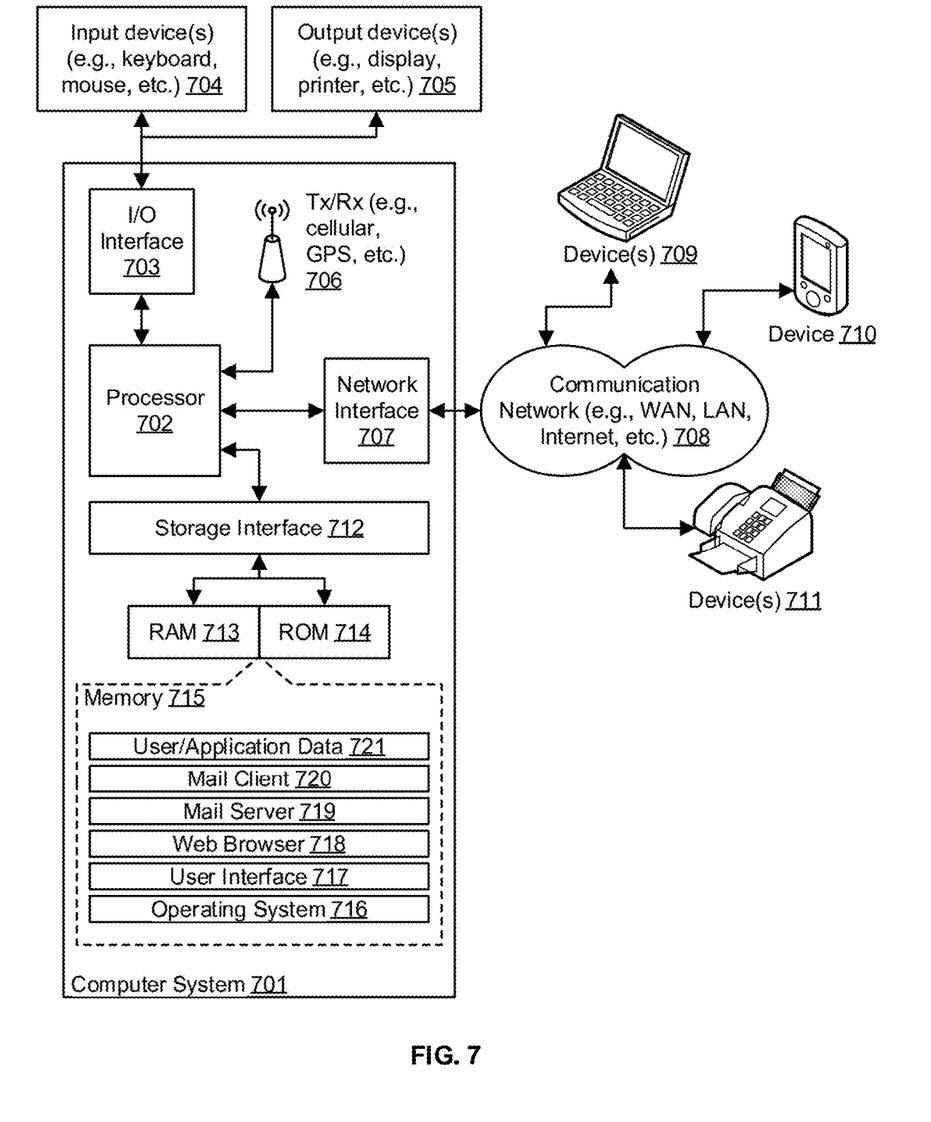
FIG. 7 is a block diagram of an exemplary computer system for implementing embodiments consistent with the present disclosure.

Referring now to FIG. 7, a block diagram of an exemplary computer system 701 for implementing embodiments consistent with the present disclosure is illustrated. Variations of computer system 701 may be used for implementing system 100 for optimizing image data for transmission. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., server rules, local events, machine learning model, image data, optimized image data, image analytics data, local decision making rules, configuration parameters, tagged image data, authentication information for image controllers, identification of image controllers, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may enable transmission of optimized image data to the remote cloud server based on processing capability of image controller and/or server, load on available resources of image controller and/or server, connection speed and bandwidth between the image controller and/or server, and so forth. The techniques described in the embodiments discussed above may provide for a distributed image/video processing system. The imaging devices or the image controller associated with the imaging devices may process the acquired image data (i.e., images/videos) based upon an estimate of a measurement of network bandwidth that is available for transmitting image or video data to the remote cloud server (i.e., central server). The techniques may further optimize image data as per available network bandwidth. The techniques therefore may employ hybrid approach of central image processing at server and edge image processing at image controller so as to achieve optimization of network bandwidth usage and computation load of processor at the server as well as at the image controller. In other words, the techniques described in the embodiments discussed above may adaptively balance the load and bandwidth requirements for the connection speed and server loading.

Additionally, as will be appreciated by those skilled in the art, the techniques described in the various embodiments discussed above may provide for configurable image analytics. For example, the techniques may not only enable configuration of type of analytics to be performed on the image data but may also enable configuration of various parameters for the image analytics. The edge image analytics may support server-defined rules and parameters for configuration. Further, a machine learning process may allow for reconfiguration of server-defined rules and parameters based on local events.

Thus, as will be appreciated by those skilled in the art, the techniques described in the various embodiments discussed above may be scalable and flexible. The image controller may act as a gateway for multiple imaging devices (i.e., a single point of contact between server and multiple imaging devices) and may control multiple feeds from the multiple imaging devices. Additionally, even though the image controller may be configured and controlled by the remote cloud server, it may be customized or improved for a particular set of imaging devices and for a particular application based on local learning. As will be appreciated, existing techniques typically measure the network bandwidth, and adapts (increase/decrease) the image/video data size by image processing techniques. In contrast, the techniques described in the embodiments discussed above may provide for image analytics in place of image data, and may further provide for localization of server-defined rules based on local learning.

The specification has described system and method for optimizing image data for transmission to a server. The illustrated steps are set out to explain the exemplary embodiments shown, and it should be anticipated that ongoing technological development may change the manner in which particular functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) may be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium may refer to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing image data for transmission to a server, the method comprising:
   receiving, by an image controller, a plurality of server rules from the server with respect to an optimization and a transmission of the image data;
   generating, by the image controller, a plurality of local decision making rules based on the plurality of server rules and one or more local events, wherein the one or more local events comprises at least one of a system parameter or a network parameter;
   analyzing, by the image controller, at least a first portion of the image data based on the plurality of local decision making rules to generate image analytics data; and
   generating, by the image controller, optimized image data for transmission to the server, wherein the optimized image data comprises at least a second portion of the image data and the image analytics data.

2. The method of claim 1, further comprising:
receiving the image data from one or more imaging devices; and
tagging the image data with at least one of a timestamp and a processing status.

3. The method of claim 1, wherein the plurality of server rules comprises at least one of a set of image analysis rules, a set of image optimization rules, and a set of data transmission rules, wherein the set of image analysis rules specifies at least one of a type of image analysis required, a definition of at least the first portion of the image data, and a plurality of image analysis configuration parameters, wherein the set of image optimization rules specifies at least one of a type of image optimization required, a definition of at least the second portion of the image data, and a plurality of image optimization configuration parameters, and wherein the set of data transmission rules specifies at least one of a type of data that is to be transmitted, and a plurality of data transmission configuration parameters.

4. The method of claim 1, wherein generating the optimized image data further comprising optimizing at least the second portion of the image data based on the plurality of local decision making rules.

5. The method of claim 1, further comprising transmitting the optimized image data based on the plurality of local decision making rules.

6. The method of claim 1, further comprising monitoring the one or more local events, wherein the one or more local events comprises at least one of a system parameter with respect to the image controller, and a network parameter with respect to a communication channel between the image controller and the server, wherein the system parameter comprises a processing load, and wherein the network parameter comprises at least one of an available bandwidth, and a required bandwidth.

7. The method of claim 1, wherein the generating the plurality of local decision making rules comprises initiating a machine learning process based on the plurality of server rules and the one or more local events, and further based on the image data and the image analytics data, and wherein the generating the image analytics data comprises:
performing one or more image analytics functions on the image data, and computing one or more analysis vectors based on one or more image attributes, the plurality of server rules, or plurality of local decision making rules.

8. The method of claim 1, further comprising:
transmitting the plurality of local decision making rules to the server; and
updating the plurality of server rules based on the plurality of local decision making rules.

9. A system for optimizing image data for transmission to a server, the system comprising:
an image controller comprising at least one processor and a computer-readable medium storing instructions that, when executed by the at least one processor, cause the at least one processor to perform operations comprising:
receiving a plurality of server rules from the server with respect to an optimization and a transmission of the image data;
generating a plurality of local decision making rules based on the plurality of server rules and one or more local events, wherein the one or more local events comprises at least one of a system parameter or a network parameter;
analyzing at least a first portion of the image data based on the plurality of local decision making rules to generate image analytics data; and
generating optimized image data for transmission to the server, wherein the optimized image data comprises at least a second portion of the image data and the image analytics data.

10. The system of claim 9, wherein the operations further comprise:
receiving the image data from one or more imaging devices; and
tagging the image data with at least one of a timestamp and a processing status.

11. The system of claim 9, wherein the plurality of server rules comprises at least one of a set of image analysis rules, a set of image optimization rules, and a set of data transmission rules, wherein the set of image analysis rules specifies at least one of a type of image analysis required, a definition of at least the first portion of the image data, and a plurality of image analysis configuration parameters, wherein the set of image optimization rules specifies at least one of a type of image optimization required, a definition of at least the second portion of the image data, and a plurality of image optimization configuration parameters, and wherein the set of data transmission rules specifies at least one of a type of data that is to be transmitted, and a plurality of data transmission configuration parameters.

12. The system of claim 9, wherein generating the optimized image data further comprising optimizing at least the second portion of the image data based on the plurality of local decision making rules.

13. The system of claim 9, wherein the operations further comprise transmitting the optimized image data based on the plurality of local decision making rules.

14. The system of claim 9, wherein the operations further comprise monitoring the one or more local events, wherein the one or more local events comprises at least one of a system parameter with respect to the image controller, and a network parameter with respect to a communication channel between the image controller and the server, wherein the system parameter comprises a processing load, and wherein the network parameter comprises at least one of an available bandwidth, and a required bandwidth.

15. The system of claim 9, wherein the generating the plurality of local decision making rules comprises initiating a machine learning process based on the plurality of server rules and the one or more local events, and further based on the image data and the image analytics data, and wherein the generating the image analytics data comprises:
performing one or more image analytics functions on the image data, and computing one or more analysis vectors based on one or more image attributes, the plurality of server rules, or plurality of local decision making rules.

16. The system of claim 9, wherein the operations further comprise:
transmitting the plurality of local decision making rules to the server; and
updating the plurality of server rules based on the plurality of local decision making rules.

17. A non-transitory computer-readable medium storing computer-executable instructions for:
receiving a plurality of server rules from a server with respect to an optimization and a transmission of the image data;
generating a plurality of local decision making rules based on the plurality of server rules and one or more local events, wherein the one or more local events comprises at least one of a system parameter or a network parameter;

analyzing at least a first portion of the image data based on the plurality of local decision making rules to generate image analytics data; and generating optimized image data for transmission to the server, wherein the optimized image data comprises at least a second portion of the image data and the image analytics data.

18. The non-transitory computer-readable medium of claim 17, further storing computer-executable instructions for monitoring the one or more local events, wherein the one or more local events comprises at least one of a system parameter with respect to the image controller, and a network parameter with respect to a communication channel between the image controller and the server, wherein the system parameter comprises a processing load, and wherein the network parameter comprises at least one of an available bandwidth, and a required bandwidth.

19. The non-transitory computer-readable medium of claim 17, wherein generating the plurality of local decision making rules comprises initiating a machine learning process based on the plurality of server rules and the one or more local events, and further based on the image data and the image analytics data, and wherein the generating the image analytics data comprises:

performing one or more image analytics functions on the image data, and computing one or more analysis vectors based on one or more image attributes, the plurality of server rules, or plurality of local decision making rules.

20. The non-transitory computer-readable medium of claim 17, further storing computer-executable instructions for:

transmitting the plurality of local decision making rules to the server; and updating the plurality of server rules based on the plurality of local decision making rules.

* * * * *